No. 738,668. PATENTED SEPT. 8, 1903.
G. H. ELLIS.
MACHINE FOR TREATING FLAX.
APPLICATION FILED MAR. 1, 1902.
NO MODEL. 8 SHEETS—SHEET 5.
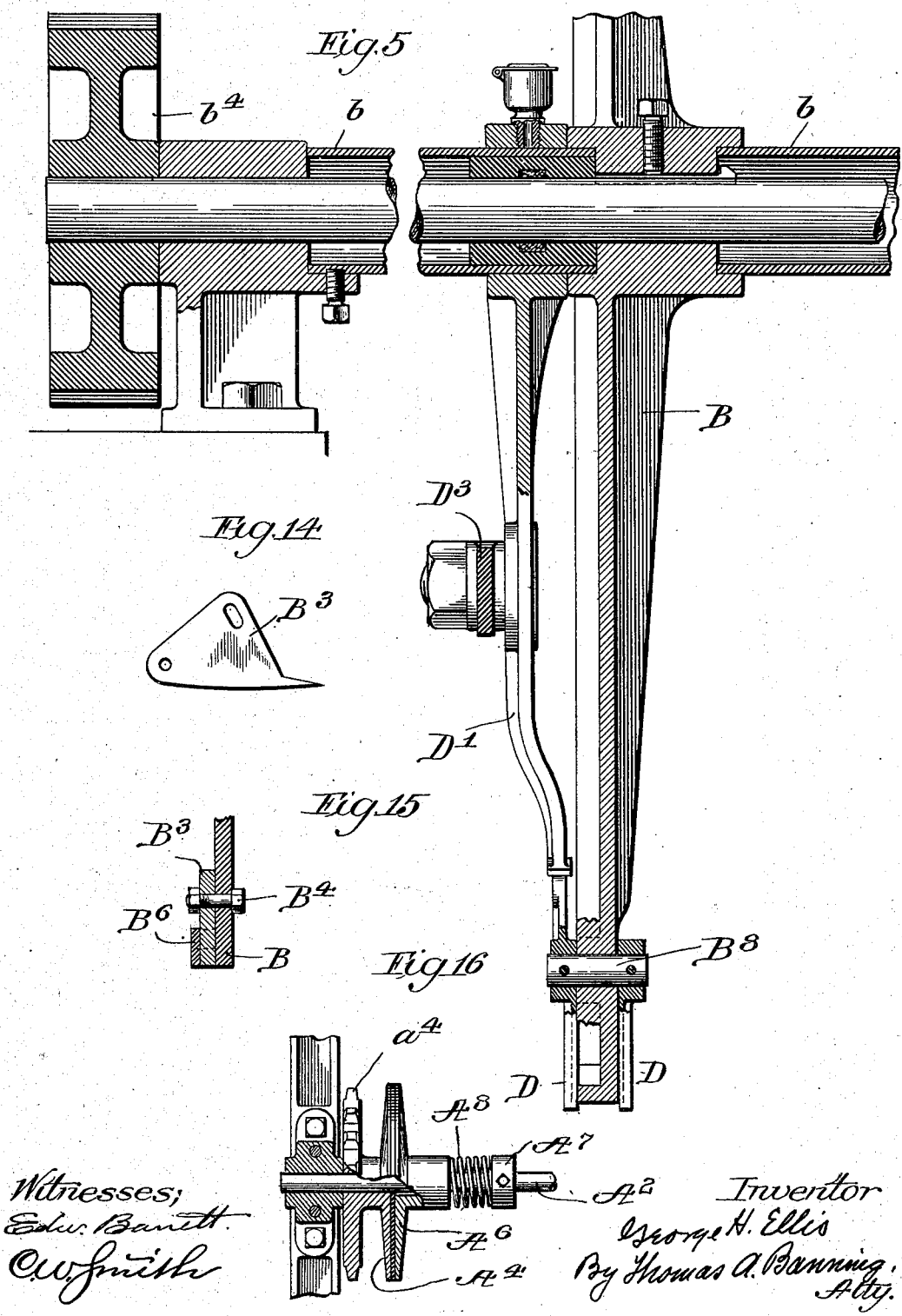

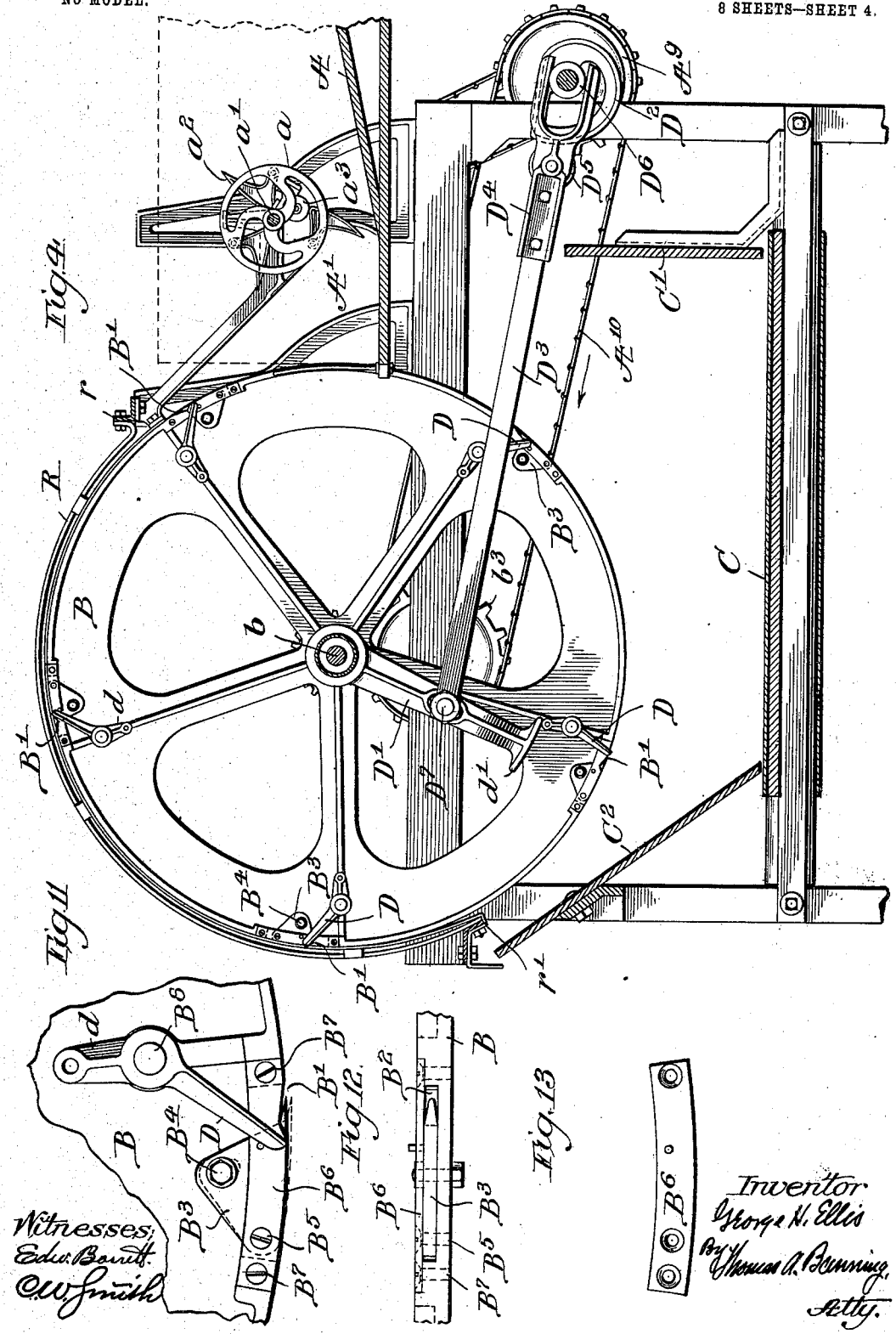

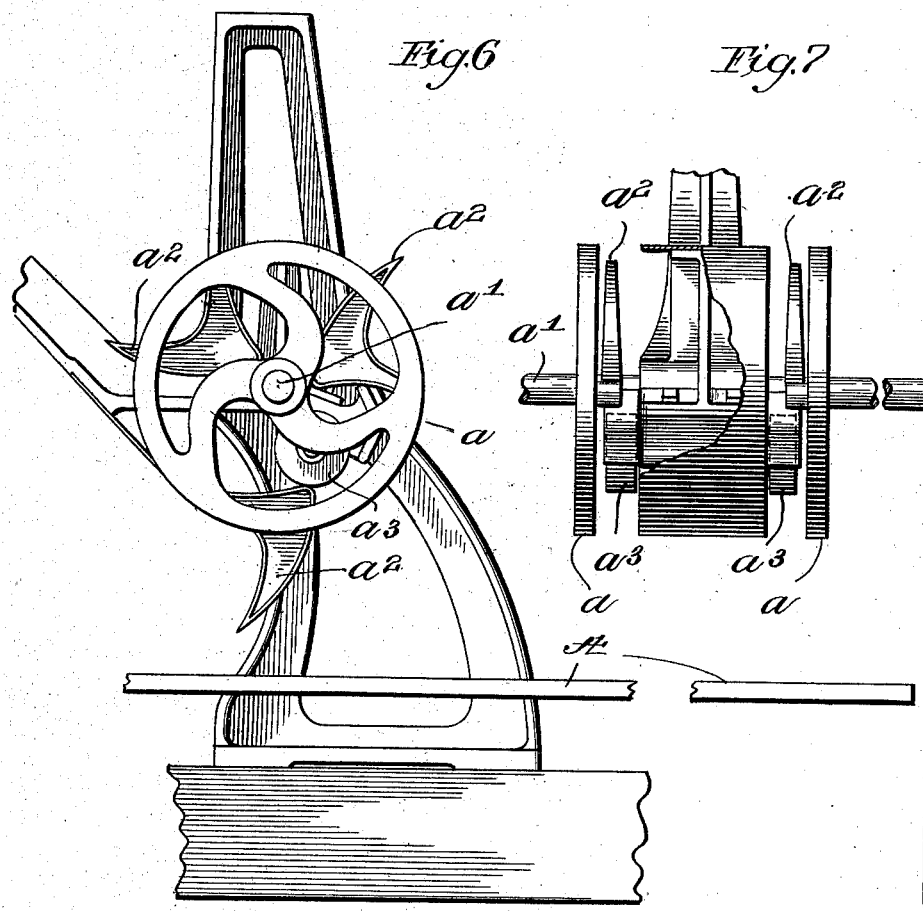
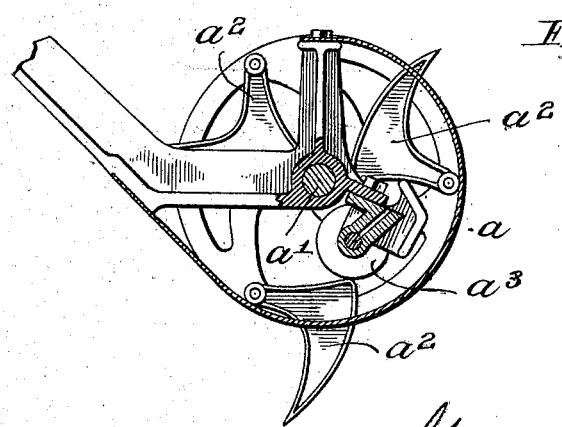

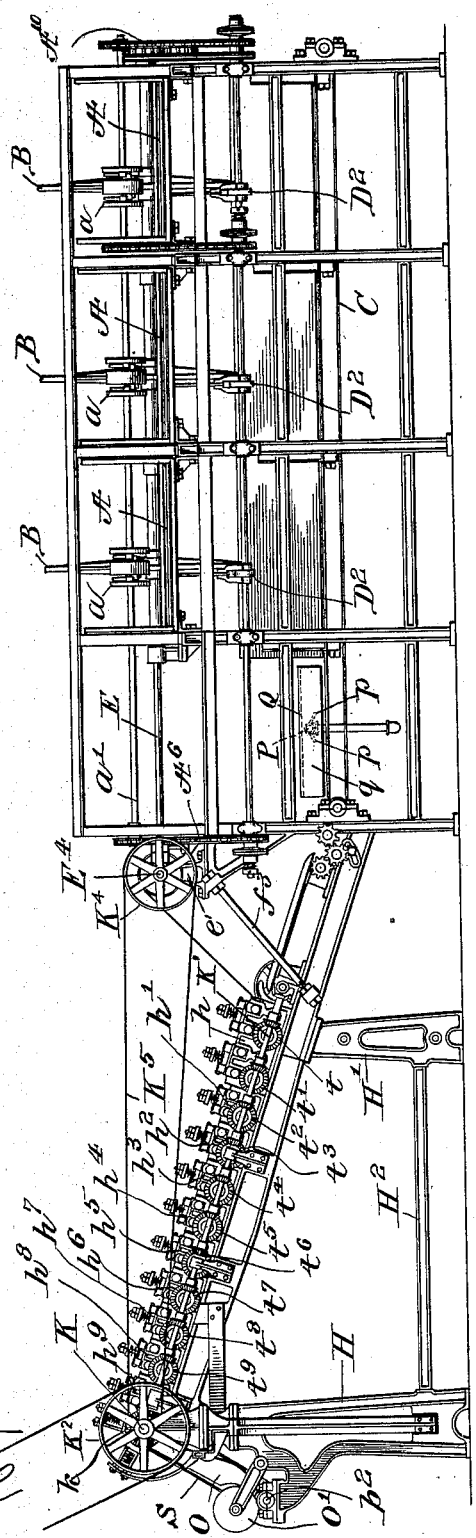

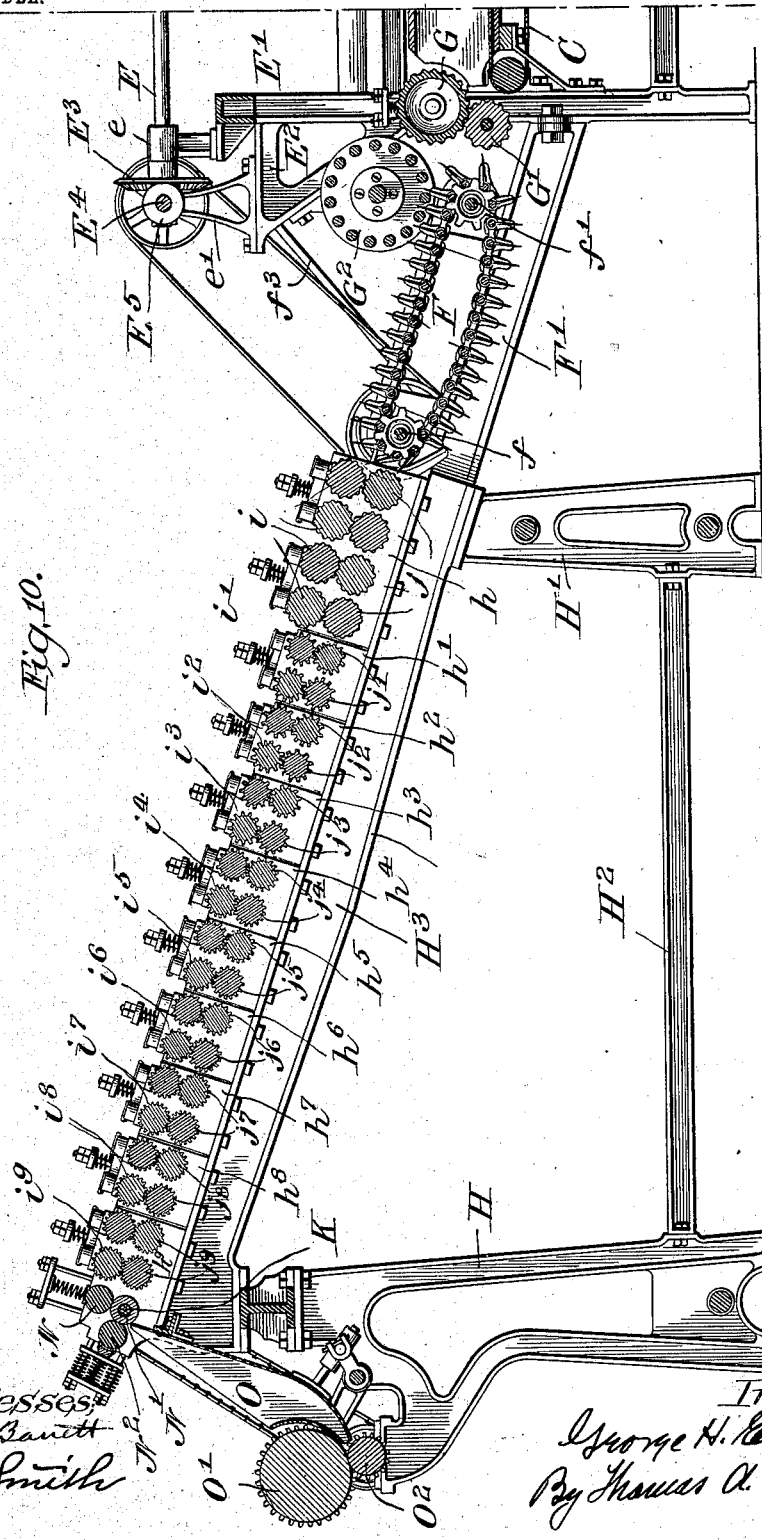

No. 738,668. Patented September 8, 1903.

UNITED STATES PATENT OFFICE.

GEORGE H. ELLIS, OF CHICAGO, ILLINOIS, ASSIGNOR TO WILLIAM DEERING, OF EVANSTON, ILLINOIS.

MACHINE FOR TREATING FLAX.

SPECIFICATION forming part of Letters Patent No. 738,668, dated September 8, 1903.

Application filed March 1, 1902. Serial No. 96,235. (No model.)

*To all whom it may concern:*

Be it known that I, GEORGE H. ELLIS, of Chicago, in the county of Cook and State of Illinois, have invented certain new and useful Improvements in Machines for Treating Flax, of which the following is a full specification, reference being had to the accompanying drawings, in which—

Figure 1:
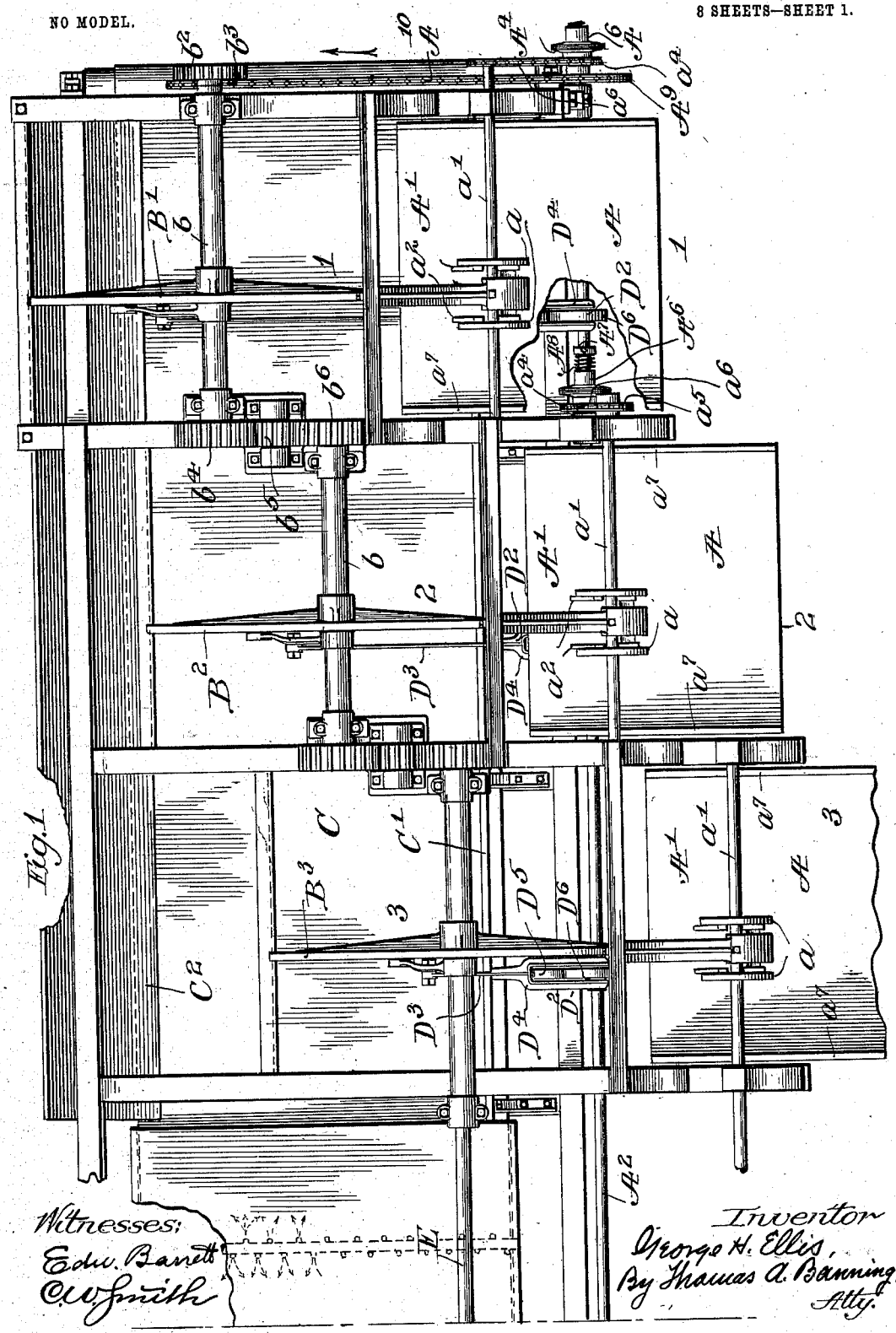
Figure 2:
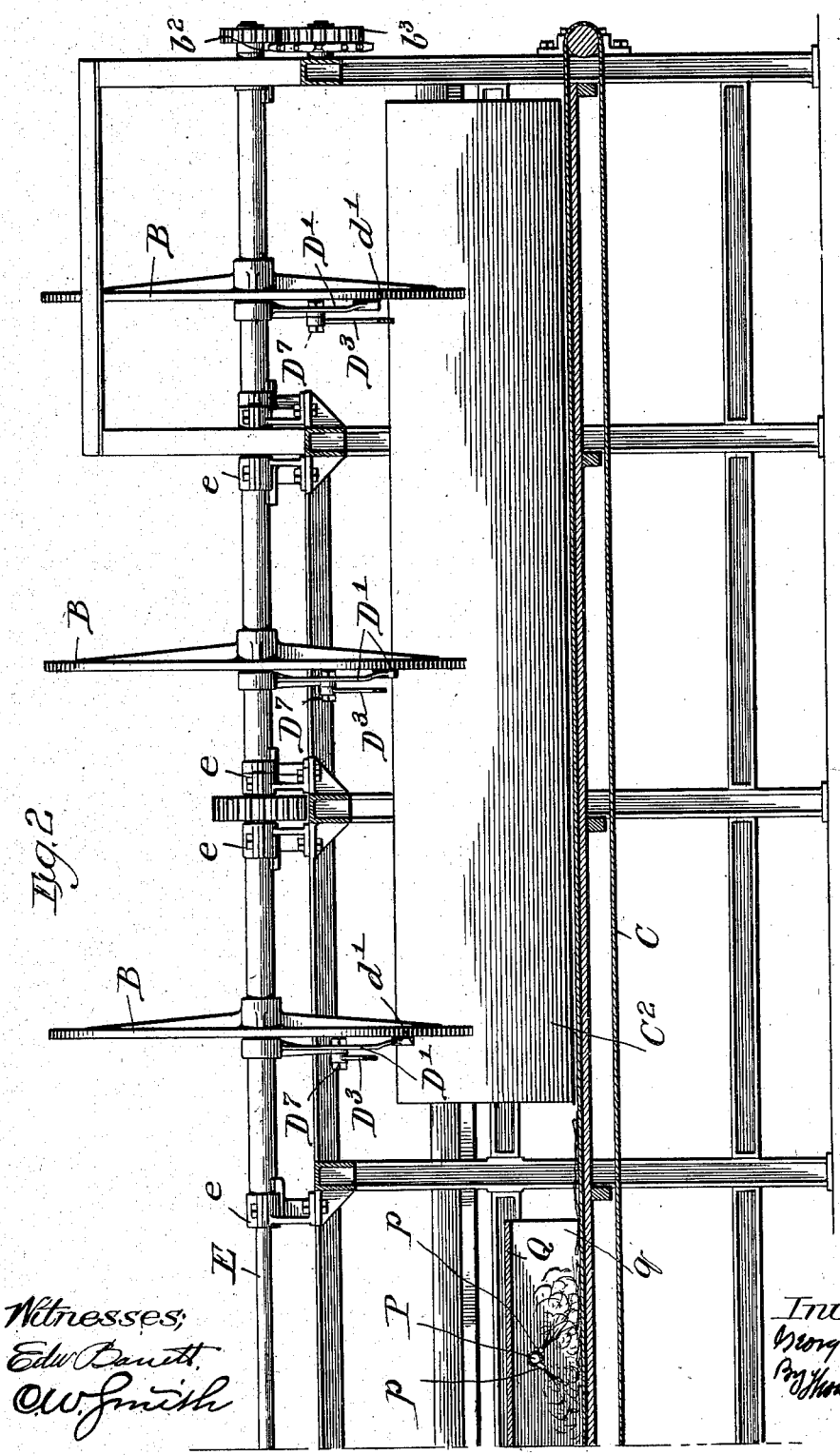
Figure 3:
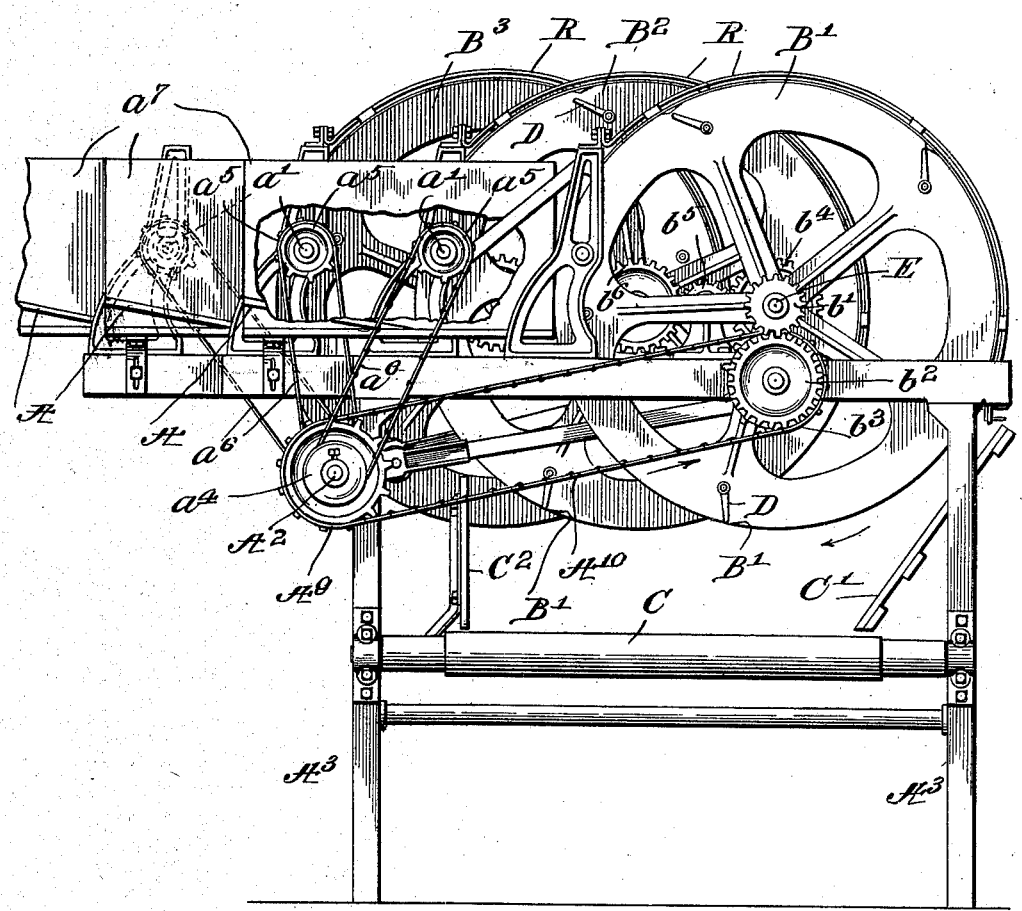

Figure 1 is a plan view of the primary and secondary feeding devices. Fig. 2 is a side elevation of the wisp-feeding wheels. Fig. 3 is an end view of the wisp-feeding wheels. Fig. 4 is a sectional end view of one of the primary feeding devices and the wisp-feeding wheel to which the said primary feeding device delivers the straw to be operated upon. Figs. 5, 11, 12, 13, 14, and 15 are details of the feeding mechanism. Figs. 6, 7, and 8 are details of construction of the primary feeding devices. Fig. 9 is a side elevation of the complete machine. Fig 10 is a sectional side elevation of the breaking-rolls and gill-chain. Fig. 16 is the friction-clutch for driving the primary feeding devices.

My machine is designed for the treatment of flax-straw and production therefrom of a twine suitable for binding grain.

The feeding devices consist of the sloping tables A A and A. On these bundles of flax-straw are placed. From them they are taken by feeders, which may be best considered by reference to Fig. 4, in which $a$ is a wheel upon the shaft $a'$, having a number of pivoted teeth $a^2$. Upon the frame is the antifriction-roller $a^3$. As the wheel revolves the curved teeth $a^2$ are carried around, and when they come in contact with the roller $a^3$ they are forced to the position shown by the lowermost one in Fig. 4, after which they are soon set free from the roller and fold within the circumference of the wheel. By means of this feeding-wheel or any equivalent which may be substituted the straws are moved into the space A'. A number of these primary feeding devices are provided, which I have numbered 1, 2, and 3. (See Fig. 1.) These wheels, each located on its shaft $a'$, may be operated by any suitable means, the preferable form being that shown in Fig. 3, where $A^2$ is a shaft supported in suitable bearings mounted upon the general framework $A^3$. Upon this shaft $A^2$ are the sprocket-wheels $a^4$. Upon the shaft $a'$ are the sprocket-wheels $a^5$. $a^6$ is a chain passing from the sprocket-wheel $a^4$ to that $a^5$. As this mode of driving is common to all three of the primary feeding devices, no further description need be entered into. I house these chains and sprocket-wheels above by suitable coverings $a^7$. As stated, the straw is moved by these feeding devices into the space A' and rests upon the table. In order that the curved feeding-teeth $a^2$ shall not be so aggressive as to force more straw into the space A' than it can take, and thus choke the machine, the feeding-wheels carrying the teeth, while supported on the shaft $A^2$, are not driven positively. The sprocket-wheels $a^4$ are secured to the shaft $A^2$ by means of friction-clutches, and each of the three feeding devices above the tables 1, 2, and 3 (see Fig. 1) are thus not driven positively.

The construction of the friction-clutch is shown in Fig. 16, where $A^2$ is the shaft. $A^4$ is a cheek-piece as one piece with the sprocket-wheel $a^4$, both of which are free on the shaft but prevented from longitudinal movement. Upon this same shaft and adjacent to it is a similar cheek-piece $A^6$, compelled by a spline to rotate with the shaft. Next to this is a spring $A^8$, surrounding the shaft, and to hold the spring in tension against the cheek-piece between $A^4$ and $A^6$ may be placed a leather or other soft disk for friction.

The operation of the feeding devices will be easily understood. The attendant places the flax-straw a bundle at a time upon the table A. It is seized by the packing-teeth, which act yieldingly under pressure, and passed into the space A', from which it is taken by B B and B, which will be referred to as "wisp-laying wheels" and are adapted to take the straw that is delivered by the primary feeders from the space A' a wisp at a time and lay it on the endless conveyer C, which in turn delivers it to the breaking-rollers. Any number of these primary feeding-wheels may be used; but I prefer three, as here shown, (numbered 1, 2, and 3.) Their construction can be best understood by reference to Fig. 4 and some of the detail figures.

Upon the upper bar of the supportingframe are the shafts $b$, having the gears $b^4$ thereupon. Also upon the main frame supported upon a suitable stud is the gear $b^2$, having as one piece with it the sprocket-wheel $b^3$. Upon the shaft $A^2$ is also secured the sprocket-wheel $A^9$. Around this sprocket-wheel and that $b^3$ is the chain $A^{10}$. These wheels move in the direction indicated by the arrows in various figures. So far as feeding purposes are concerned the shaft $A^2$ may be considered as the prime mover. Motion is imparted from the shaft $b$ of the wisp-feeding wheel No. 1 (see Figs. 1, 2, and 9) as follows: On the shaft $b$ is secured the gear $b^4$. Upon the frame in suitable bearings is the gear $b^5$, and upon the shaft $b$ of the wisp-feeding wheel No. 2 is the gear $b^6$. The wisp-feeding wheel No. 2 is thus driven, and by precisely the same parts motion is transmitted from wheel No. 2 to wheel No. 3. The shafts of these wheels are upon the same horizontal plane; but each wheel is offset relative to the other, as shown in Figs. 1 and 3, for reasons that will soon be understood.

Turning for a moment to Fig. 12 a detail of the wisp-feeding wheel is shown. The wheels are provided with a series of notches $B'$. They are constructed in the following manner: In the periphery of the wheel is a slot $B^2$, preferably formed by cutting a recess and placing the plate $B^3$ therein. In order that the notch $B'$ may be adjustable, I slot the plate, as shown in Fig. 14, and through the slot place the bolt $B^4$. The plate is also pivoted upon the screw $B^5$. $B^6$ is a plate which when secured by the screws $B^7$ maintains the plate $B^3$ in the slot. The purpose of adjusting the plate $B^3$ in its place is that the notches $B'$ may be increased or decreased in size, so as to regulate the quantity of straw taken, which adjustment is shown by dotted lines in Fig. 11. $B^8$ is a short shaft passing through the wheel B, and upon it is the double lever D, the long end of which reaches when in its position of rest, as shown in Figs. 5 and 11, to the periphery of the wheel B. The short end of this lever extends a little distance toward the center of the wheel upon one side thereof. The lever is preferably made double in effect, as shown in section in Fig. 5, where upon the opposite side of the wheel another member of the lever is placed, one arm thus being upon each side of the wheel B. Upon each of the shafts $b$ is an arm $D'$, having on its ends a short track. The short end $d$ of the lever D extends inward toward the shaft $b$ and is adapted to engage the short track $d'$ upon the end of the arm $D'$. The arm $D'$ does not rotate, and consequently as the wheel rotates, carrying with it the lever D, the short arm strikes the track $d'$ and causes said lever D to rock from the position shown in Fig. 11 to that shown in the one that is at the lowermost position in Fig. 4. The action will be understood if we suppose that the notch $B'$ contains a wisp of straw. As the lever D is actuated by striking the track $d'$ the wisp of straw is at once forced from the notch and may fall to the conveyer C. The arm $D'$ is free to move on the shaft $b$. Each wisp-laying wheel is provided with a number of these devices.

Upon the shaft $A^2$ is a series of cams $D^2$. (Shown in detail in Figs. 1 and 4.) Pivoted to the arm $D'$ is the pitman $D^3$, which terminates in a casting $D^4$, having the antifriction-roller $D^5$. Upon the shaft $A^2$ is also an antifriction-roller $D^6$. The crotched portion of the casting $D^4$ rests upon the last-mentioned antifriction-roller. As the cam $D^2$ revolves it is clear that through the instrumentality of the pitman $D^3$ the arm $D'$ will be rocked, and consequently the track $d'$ will not always intercept the lever D at the same point. This pitman $D^3$ is actuated positively in its forward direction or to the left, as shown in Fig. 4, by the cam $D^2$, as above indicated, and its return is effected by gravity. If desired, however, a spring may be interposed between a fixed portion of the machine and the said pitman to insure its prompt return.

On each of the wisp-laying wheels B, I preferably place five of the double levers D. As the cam $D^2$ causes the arm $D'$ to move back and forth once during each revolution of the cam $D^2$, the lever D being thus actuated at different times causes the wisps taken at the notches to fall in different places on the conveyer C. The pitman $D^3$ is preferably adjustably secured to the arm $D'$ by means of the bolt $D^7$, which may be moved in a slot in the said arm, and thus regulate the throw of the latter to a limited extent. I find three of the wisp-laying wheels, as shown in Fig. 1, sufficient for ordinary purposes.

R is a flexible strap, preferably of steel lined with leather, secured at $r$ to the framework of the machine immediately over the space $A'$ of the table and again secured to the framework at $r'$. This strap is wide enough and drawn tightly enough to keep its place on the wheel. Its purpose is to hold the wisps that have been engaged by the notches of the wheel until they are in beyond it. The wisps are held by friction in the notches sufficiently to remain until forced therefrom by the double lever D. We have, it is seen, three wheels, each with five notches and preferably revolving at about the same rate of speed, and thus by each revolution fifteen wisps of straw are laid upon the conveyer and distributed across its entire width. In order that the wisps may not escape the conveyer C, side boards $C'$ and $C^2$ are provided.

If Figs. 2 and 10 be placed together, the bottom of the former against the top of the latter, the feeding devices so far explained will be in proper relation to the breaking mechanism next to be described. The shaft $b$ of the wisp-feeding wheel B, No. 3 of the series, is connected to the shaft E, which is journaled in the bearing $e$, suitably supported upon the general frame structure, as shown in Fig. 10. Upon brackets $E^2$ are the journal-bearing supports $e$, as shown in Figs. 9 and 10. Upon the shaft E is the gear $E^3$.

$E^4$ is a shaft journaled in the bearings $e'$. Upon the shaft $E^4$ is the bevel-pinion $E^5$. The last-named shaft serves as motive power for the gill-chain F.

$f$ and $f'$ are shafts mounted in the journal-bearings on the bars $F'$ of the framework. These bars are secured to the vertical part $E'$ of the general frame of the feeding devices, as shown in Fig. 10. The bars $F'$ are braced to the general framework of the feeding devices by the rods $f^3$.

At the delivery end of the conveyer C are the fluted rollers G and $G'$, which deliver the straws upon the conveyer C to the said gill-chain. Immediately above the gill-chain is the trundle-wheel $G^2$, which presses the straws upon the gill-chain. The gill-chain may be of any ordinary structure and driven in any desired manner. Movement may be given to the conveyer C in any manner desired.

H and $H'$ are strong metallic posts connected by cross-bars $H^2$. Upon these rest the strong bar $H^3$. This framework helps to also sustain the bars $F'$, upon which the bearings of the shafts of the gill-chain are supported. Upon the bar $H^3$ are two series of pillow-blocks $h$, $h'$, $h^2$, $h^3$, $h^4$, $h^5$, $h^6$, $h^7$, $h^8$, and $h^9$. As the pillow-blocks upon the two sides of the frame are duplicates, little further need be said. In these pillow-blocks are journaled the rollers $j$, $j'$, $j^2$, $j^3$, $j^4$, $j^5$, $j^6$, $j^7$, $j^8$, and $j^9$. These pillow-blocks also form bearings for a series of fluted rollers $i$, $i'$, $i^2$, $i^3$, $i^4$, $i^5$, $i^6$, $i^7$, $i^8$, and $i^9$. These rollers, with those $j$, $j'$, $j^2$, $j^3$, $j^4$, $j^5$, $j^6$, $j^7$, $j^8$, and $j^9$, serve the usual purpose of breaking-rolls, and as they do not differ in form or function it is not necessary to describe them except to say that the rollers $i$ and $j$ are larger than those that follow and the rollers $i$ $i^2$ $i^3$ and $j$, $j^2$, and $j^3$ have flutes of greater pitch than those following them in the line of movement of the straw in passing from the gill-chain onward. In order to give the various rollers rotation, a shaft K is journaled at the delivery end of the framework, as shown in Fig. 9. Upon this shaft are secured two bevel-gears $k$, only one, however, being shown. (See Fig. 9.) On each side of the frame which supports the breaking-rollers are the lay-shafts $K'$, journaled in suitable bearings which are secured to said frame. These lay-shafts $K'$ are provided with pinions on the upper ends thereof which mesh with the said bevel-gears $k$ on the shaft K, thus imparting motion to the said lay-shafts. On these lay-shafts are secured beveled pinions located to mesh with and drive the bevel-gears $t$ $t'$ to $t^9$, which are secured to the lower rollers $j j'$ to $j^9$ of the series of breaking-rollers. The lay-shaft $K'$ on one side of the machine, with its pinion, is adapted to drive each alternate roller, the other side being correspondingly arranged, so that all of the lower rollers are thus given a positive motion. The pairs of rollers being correspondingly fluted, the upper ones in mesh with the lower ones will thus receive motion. Secured to the shaft K is the driving-pulley $K^2$. The shaft K serves as motive power for the gill-chain and breaking-rollers. Upon this shaft is also secured a driving-pulley, the pulley itself not being shown, but its position indicated by the belt $K^5$ in Fig. 9. Around this driving-pulley passes the belt $K^5$, extending to and engaging the pulley $K^4$, which is secured to the shaft $E^4$. By this last belt power is transmitted to the feeding devices, as first explained. The upper members of the series of breaking-rollers may be driven in any suitable manner.

N and $N'$ are smooth rollers, the latter upon the shaft K, which receive the broken straws from the last pair of the series of breaking-rollers and draw them therefrom. In order to take the mass of straw, which by the operation has become practically a sliver therefrom, I apply the smooth roller $N^2$, which deflects the straw downward along the guide O, from which it is drawn by the rollers $O'$ and $O^2$. The last-named rollers are geared together and are given movement by the chain S, passing from the rollers above to the shaft of the roller $O^2$, or motion may be imparted in any desired manner.

I find it very advantageous to have the flax-straws in a dry condition before operating them in order that the woody portions may break more easily and separate from the fiber, and I also find that if the cortices are slightly dampened they are less injured by the action of the breaking-rollers than otherwise. In connection with the last statement it should be added that in order to have the cortices of the flax-straw properly affected by moisture without imparting any moisture to the interior of the stalk the application of same must be made in the form of an aqueous vapor or in particles of an insensible size. I am aware that it is not new to apply water in the liquid form in streams or in drops to the fiber in process of treatment or in breaking—for instance, in such a manner as is shown by English patent to Butchart, No. 1,034, April 6, 1867; but in this case cited and in others where an application of water is made the manner and form in which it is applied could not avoid wetting the interior of the stalk, and such wetting would defeat the purpose for which I apply it—namely, that of toughening the cortices without wetting, and thus toughening the interior of the stalk. It follows, therefore, that it is of the utmost importance that water be applied in a finely-divided state in distinction from water applied in a stream or in drops of appreciable size. Water applied in quantities aggregating a drop of a sensible size or larger would immediately upon contacting the straw penetrate to and wet the interior to a degree that would greatly impair the effectiveness of the subsequent action of the breaking-rollers. In order to dampen the cortices, I provide a steam pipe or pipes P, having jets $p$, preferably placing the said pipe or pipes over the endless conveyer, as shown in Fig. 2. These jets are boxed in by the covering Q and side boards $q$ in order to increase their effectiveness. The ends are left open, so that the mass of straws carried by the conveyer may enter and pass out. Instead of using steam-jets, however, as above described, to dampen the straw an air-blast may be used in connection with a stream of water to produce an aqueous vapor.

In smaller machines I do away with the primary feeding devices and place the bundle of straw on the table at A' and with suitable pressure hold it against the wisp-feeding wheel, by which it is taken and deposited on the endless conveyer C. If the axes of the wisp-feeding wheels were all in line, by the action of the double lever D in controlling the point at which the wisps are dropped the said wisps would be spread upon the canvas, but not as thoroughly as by having the three wisp-feeding wheels placed as shown.

The means for actuating the rollers is not fully shown in the drawings, as it forms no part of this invention. The general means, however, is made plain.

Having described the machine, its operation may be briefly described as follows: Flax-straw is placed upon the sloping feeding-tables A adjacent to the primary feeding devices, against which it is constantly fed and held by the slope of the said tables. The arms $a^2$ of the wheels $a$ of the primary feeding device engage the straw and deliver it to the space A' adjacent to the wisp-laying wheels. This space A' is kept constantly full, while undue pressure of the straw therein is prevented by the said yielding arms $a^2$ and also by the friction-clutch controlling the movement of the said feeding device. The straw from this space A' is pressed into the notches B' in the rotating wisp-laying wheels B, the amount received by each notch being regulated by the notch-adjusting device already described. The wisps of straw are ejected from these notches and delivered to the endless conveyer C, the ejection being effected by the roller on the arm D' impinging the track $d'$ of the vibrating arm D'. The vibrating movement of said arm D' is produced by the pitman $D^3$ and actuating-cam $D^2$, as previously described. In this manner wisps of straw are deposited at relative varying times and distances upon the said conveyer C. With three wisp-laying wheels each provided with five notches, as shown, it follows that fifteen wisps of straw will be deposited upon the conveyer C for each revolution of the notched wheels, and owing to the uniform variations of the ejecting mechanism, the offset of the shafts bearing the notched wheels, and the movement of the cams upon which they are deposited these fifteen wisps will be uniformly disposed both laterally and longitudinally. In this manner an even swath is formed and fed to the drawing-chains and breaking-rollers. Before it is delivered to the said drawing-chains and breaking-rollers it is subjected to the action of vapor of water by the jets $p$ of the steam-pipe P for the purpose already stated. The details of the subsequent operation need not be dwelt upon further than to say that the operation is one of ordinary breaking and drawing in the well-known way.

What I claim as my invention, and desire to secure by Letters Patent, is—

1. The combination of a receiving-table, yieldingly-acting primary feeding devices, the wisp-laying wheel and conveyer, all combined substantially as described.

2. A series of feeding-tables, a series of wisp-laying wheels and a conveyer, the axis of each wheel offset laterally relative to the other wheels, substantially as described.

3. The combination of a receptacle, a wisp-laying wheel adapted to take the straw therefrom, a conveyer and means whereby the place of deposit of the wisp upon the conveyer is made variable, substantially as described.

4. A receiving-table, a wisp-laying device consisting of the wheel B provided with notches and means for forcing the wisps from said notches at progressively-varying times, substantially as described.

5. The wisp-laying wheel provided with notches and the lever for forcing the wisps out of said notches, an automatically-moved track for controlling the action of said lever in forcing the wisps from the notches, all combined substantially as described.

6. The wisp-laying wheel provided with notches and the lever for forcing the wisps out of said notches, an automatically-moved track for controlling the action of said lever in forcing the wisps from the notches, the said track vibrating about a center coincident with the center of rotation of said wisp-laying wheel, substantially as described.

7. A series of primary feeding devices, a series of wisp-laying wheels, the axes thereof offset laterally and the said wisp-laying wheels adapted to deposit the wisps at progressively-varying times, a conveyer, the gill-chain and breaking-rolls, all combined substantially as described.

8. A wisp-laying wheel, a conveyer, drawing and breaking devices, and means whereby the place of deposit of the wisps upon the conveyer is automatically controlled, substantially as described.

9. A feeding device, a wisp-laying wheel, a conveyer, drawing and breaking devices, and means whereby the place of deposit of the wisps upon the conveyer is automatically controlled, substantially as described.

10. A series of feeding devices, a series of wisp-laying wheels, a conveyer, drawing and breaking devices, and means whereby the place of deposit of the wisps upon the conveyer is automatically controlled, all combined substantially as described.

11. In a flax-breaking machine, in combination the breaking-rollers and means for depositing moisture in a vaporous form upon the material being operated upon for toughening the cortices thereof, the said means for depositing the moisture being located operatively in advance of the said breaking-rollers, substantially as described.

12. In a flax-breaking machine, the combination of the breaking-rollers and a dampening device for toughening the cortices of the flax-straw, the said dampening device consisting of steam-jets located in a position adapting them to operate upon the cortices of the flax-straw between the said feeding device and the said breaking-rollers, substantially as described.

13. In a flax-breaking machine, in combination breaking-rollers, a feeding device and means for depositing moisture in a vaporous form upon the material being operated upon for toughening the cortices thereof, the said means for depositing moisture being located operatively in advance of the said breaking-rollers, substantially as described.

14. In a flax-breaking machine, the combination of the feeding device, the breaking-rollers and a dampening device for toughening the cortices of the flax, the said dampening device consisting of steam-jets located in a position adapting them to operate upon the cortices of the flax-straw between the said feeding device and the said breaking-rollers, substantially as described.

GEORGE H. ELLIS.

In presence of—
EDW. R. BARRETT,
C. W. SMITH.